Patented June 19, 1951

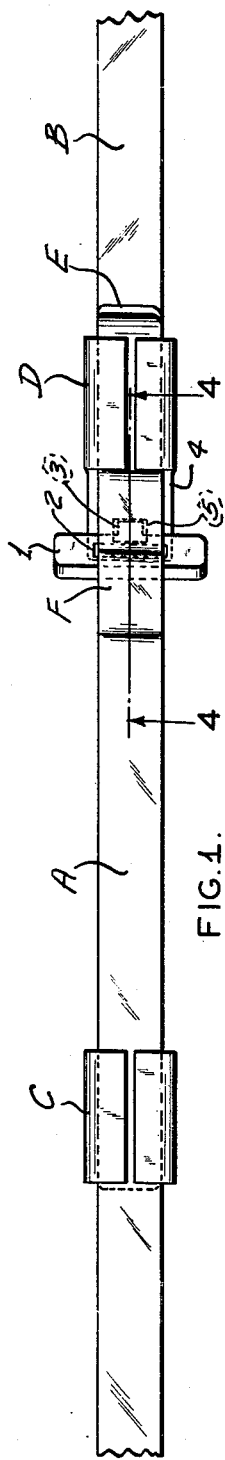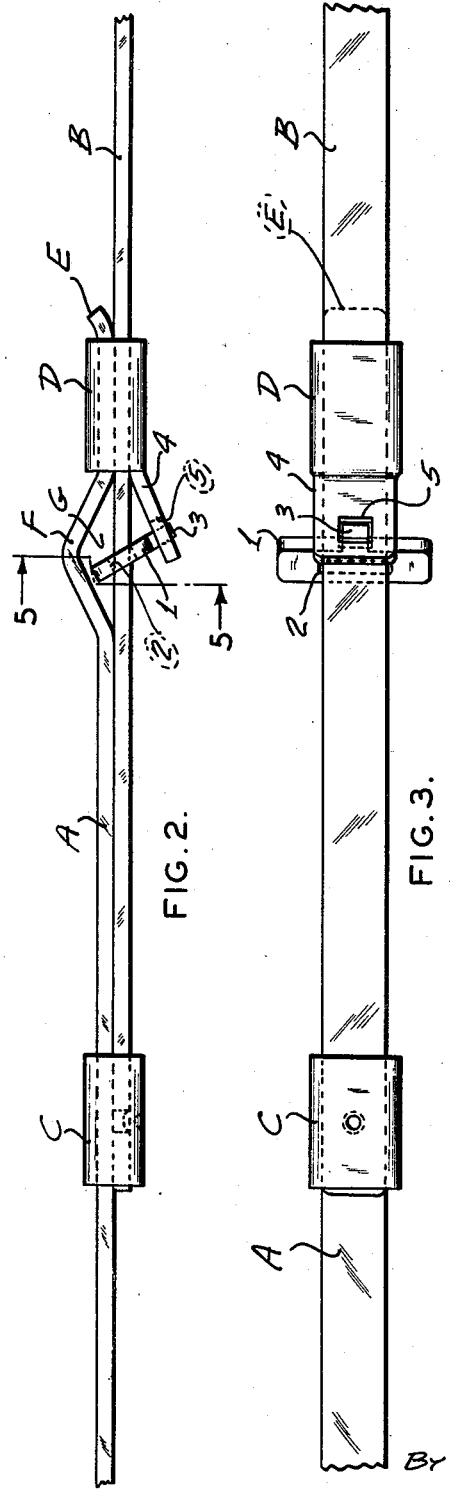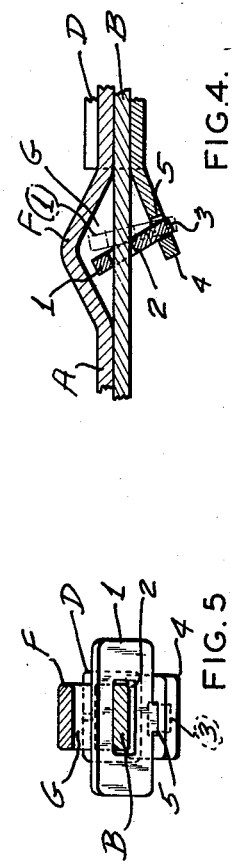

2,557,892

UNITED STATES PATENT OFFICE 2,557,892

LOCKING DEVICE

John V. Rowan, University City, Mo., assignor to Lee-Rowan Company, St. Louis, Mo., a corporation of Missouri Application August 26, 1946, Serial No. 693,079

1 Claim. (Cl. 287—58)

This invention relates to locking devices, and particularly to a device of this type for use on a garment stretcher, for instance, a trousers creaser, or the like, where it is desired to adjust two sliding members to a certain position and lock them in this position against sliding movement in one direction while at the same time permitting sliding movement in the opposite direction. The principal advantage of the device is that the stretcher or creaser of which it forms a part can be easily and quickly locked in the desired position after being inserted in the garment and adjusted. Another advantage is that it provides a very secure lock against loosening of the creaser so that it will not accidentally slip out of the garment, but at the same time permits its being tightened within the garment by merely exerting a pull on the sliding members of the creaser.

In addition to the above, my device is of such simple and inexpensive construction that it will not add greatly to the cost of producing the creaser, and it has no parts that will easily get out of order.

In the drawings—

Fig. 1 is a top plan view of my locking device as it appears when mounted on the two sliding members of the trousers creaser in locked position.

Fig. 2 is a side elevation of the locking device as it appears when in locked position mounted on the two sliding members of the trousers creaser.

Fig. 3 is a bottom plan view of the locking device illustrated in Figs. 1 and 2.

Fig. 4 is an enlarged view taken on line 4—4, Fig. 1, showing the locking key in locked position in full lines and in open position in dot and dash lines.

Fig. 5 is a view taken on line 5—5, Fig. 2, illustrating the locking key in locked position.

I will describe my locking device as being applied to a trousers creaser, which includes two longitudinal members A and B, preferably formed of flat metal, which are slidably mounted with relation to each other. The members A and B are held together by a collar C which is positioned transversely of said members, surrounding them both, and is rigidly secured to the member B at its free end. A transversely positioned collar D surrounds the members A and B near the free end of the member A, which at its extremity is slightly upturned, as shown at E, to prevent the member A from sliding completely through the collar D. As will be noted from Fig. 2, the collars C and D hold the members A and B in juxtaposition to each other while permitting their sliding relationship, but immediately adjacent the collar D, at the end opposite to that adjacent the upturned extremity E, the member A is bent to form a V-shaped portion F, thus providing a space G between the members A and B and also serving to keep the collar D from sliding on the member A; that is to say, the collar D is kept from sliding with relation to the member A by the upturned extremity E and the V-shaped portion F, but the member B is slidable within said collar, as will be clearly understood from Fig. 2.

The parts thus far mentioned do not in themselves constitute elements of the invention, and will therefore not be further described.

The invention itself comprises a flat metal locking key 1 which is mounted upon the member B through an aperture 2 in said key, so that the upper portion of the key 1 extends up into the space G, the aperture 2 being of such shape as to conform generally to the cross-sectional shape of the member B, but being of very slightly larger dimensions. At its lower edge the locking key 1 has an outwardly extending tongue 3. From the lower edge of the collar D a projection 4 extends diagonally under the member B, and the projection 4 has an aperture 5 through which the tongue 3 extends, said aperture 5 being of somewhat larger dimensions than the tongue 3. The parts 1 to 5, inclusive, are most clearly seen in Figs. 2 and 4.

In operation the procedure is as follows: Suppose the creaser is to be used to stretch and crease a leg of a pair of trousers. The members A and B are inserted cross-wise into the trousers leg and pulled in opposite directions until together they acquire the desired length to stretch the trousers leg. The locking key 1 automatically assumes a position diagonal with respect to the longitudinal member B, and, as will be understood from Fig. 2, by virtue of the aperture 2 this has the effect of instituting a gripping engagement between the locking key 1 and the member B, and also a gripping engagement between the tongue 3 and the projection 4 through the aperture 5, and these two points of gripping engagement serve to prevent sliding movement toward each other of the members A and B, thus locking them in extended position. This is brought out in Fig. 2 and in full lines in Fig. 4. However, the relative positions of the parts as just described do not prevent further extension of the members A and B, so that by a continued pull on said members they may be still further extended to fit very tightly in the trousers leg, without danger of being accidentally loosened therein.

In order to disengage the creaser from the trousers leg, the above operation of the locking key is reversed; that is to say, the upper portion of the locking key 1, which is in the space G, is pushed backwardly by the fingers until it assumes the position shown in dot and dash lines in Fig. 4, which loosens the gripping engagement between the key 1 and the member B, and also between the tongue 3 and the projection 4, thus releasing these parts for sliding movement in a collapsing direction, whereupon the members A and B may be loosened in the trousers leg by pushing them toward each other, and they can then be removed from the trousers leg.

I claim:

A locking device for a garment creaser or the like which includes a pair of elongated members slidable with relation to each other, a collar loosely mounted upon one of said members for sliding movement thereon and secured to the other said member, an apertured projection on said collar, a tiltable transversely apertured element mounted on said projection and slidably mounted on one of said elongated members whereby endwise pressure on said one of said members in one direction causes said tiltable element to tilt and firmly grip said member on which it is slidably mounted and permits slidable movement when endwise pressure in the opposite direction is exerted, and an extension on said tiltable element whereby it can be manually tilted to release the gripping action of said element.

JOHN V. ROWAN.

REFERENCES CITED

The following references are of record in the file of this patent:

UNITED STATES PATENTS

| Number | Name | Date |
|---|---|---|
| 1,869,284 | Swanson | July 26, 1932 |
| 2,294,967 | Eberhardt | Sept. 8, 1942 |